United States Patent [19]

Paradis

[11] Patent Number: 4,728,075
[45] Date of Patent: Mar. 1, 1988

[54] CONTROL OF FLUID FLOW

[76] Inventor: Joseph R. Paradis, 60 Plymouth Rd., Holden, Mass. 01520

[21] Appl. No.: 229,110

[22] Filed: Jan. 28, 1981

[51] Int. Cl.⁴ .............................. F16K 1/38; F16K 1/52
[52] U.S. Cl. ..................................... 251/122; 251/340; 251/903
[58] Field of Search ................. 251/340, 122, DIG. 4, 251/903

[56] References Cited

U.S. PATENT DOCUMENTS

| 665,083 | 1/1901 | Friedmann | 251/903 X |
| 2,125,554 | 8/1938 | Franck | 251/340 |
| 2,822,789 | 2/1958 | Philips et al. | |
| 2,865,596 | 12/1958 | Monnig | 251/340 X |
| 3,027,136 | 3/1962 | Renaldi et al. | 251/340 |
| 4,099,706 | 7/1978 | Steele et al. | 251/367 |
| 4,230,300 | 10/1980 | Wiltse et al. | 251/340 X |
| 4,281,678 | 8/1981 | Glaycomb | 251/63 |

FOREIGN PATENT DOCUMENTS 1293911  4/1962  France .......................... 251/DIG. 4

Primary Examiner—Arnold Rosenthal
Attorney, Agent, or Firm—George E. Kersey

[57] ABSTRACT

Method and apparatus for the control of fluid flow using a metering plug that is positioned in a control channel and restricted to movement along the longitudinal axis of the channel. Closure control is exercised by moving the plug with a micrometer adjustable control ring into closer proximity with a tapered channel that has a profile corresponding to that of the plug.

5 Claims, 4 Drawing Figures

CONTROL OF FLUID FLOW

BACKGROUND OF THE INVENTION

This invention relates to flow control, and, more particularly to the control of fluid flow for in-line applications.

In many situations it is necessary to control the in-line flow of fluids such as liquids and gases. A common device for that purpose is a variable clamp. It functions by squeezing the line to constrict the opening through which the fluid passes. It requires that the line have sufficient resiliency to recover when the clamping pressure is removed. The objection to the clamping technique is that it cannot be used with relatively rigid conduits. In addition, the control that is exercised over fluid flow by clamping is imprecise.

Attempts have been made to overcome the foregoing difficulties by the use of valves which are placed in the line. Such valves tend to be complex and expensive. They are usually imprecise in their operation. They frequently provide an initial flow surge and are characterized by dead space. In addition they tend to drift and do not have a stable set position. The principal objection however is that they usually provide imprecise control over flow and are not able to provide flow control over a wide range. Typical flow control devices of the prior art are those illustrated in the following patents:

| Patent No. | Issued | Inventor |
| --- | --- | --- |
| 4,073,314 | 2/14/78 | Speelman, et al. |
| 3,943,969 | 3/16/76 | Rubin, et al. |
| 3,659,573 | 5/2/72 | Bennett |
| 3,503,418 | 3/31/70 | Petrucci, et al. |
| 3,255,774 | 6/14/66 | Gallagher, et al. |

Accordingly, it is an object of the invention to facilitate the control of fluid flow. A related object is to facilitate the control of fluid flow for in-line applications.

A further object of the invention is to overcome the difficulties associated with prior flow control valves. A related object is to avoid the difficulties associated with clamping type valves.

Still another object of the invention is to avoid initial flow surge in flow control valves, as well as a reduction in dead space in flow control valves.

Yet another object of the invention is to provide a flow control valve with fine metering as well as repeatable flow adjustments. Still another object is to achieve stable locking with reduced drift. A further object is to provide a comparatively broad range of flow control adjustment.

SUMMARY OF THE INVENTION

In accomplishing the foregoing and related objects, the invention provides for the exercise of flow control using a metering plug that is restricted to movement along the longitudinal axis of a control channel. This avoids the disadvantages of clamping valves and valves with variable positionable disks.

In accordance with one aspect of the invention, closure control is exercised by moving the plug with a micrometer adjustable control ring. This brings the plug into controllable proximity with a tapered channel that has a profile which mates that of the plug.

In accordance with another aspect of the invention, the valve can be produced by the injection molding of plastic parts without parting lines and their attendant disadvantages. The valve is readily assembled using an "O" ring between a base connector and a mating transitional section containing a tapered channel.

In accordance with still another aspect of the invention, the transitional section contains internal passages that accommodate positioning fins on the metering plug to promote the accuracy of the controlled spacing between the transition section and the plug.

In accordance with yet another aspect of the invention, the base connector also includes guide channels that receive positioning fins of the metering plug to provide enhanced control over flow. In addition, the valve desirably includes an adjustable flow control ring that moves the transitional member with respect to the base member. The former is engaged by the flow control ring through a lock ring on the transitional member which is advantageously secured by ultrasonic bonding.

DESCRIPTION OF THE DRAWINGS

Other aspects of the invention will become apparent after considering several illustrative embodiments taking in conjunction with the drawings in which.

DETAILED DESCRIPTION

Figure 1:
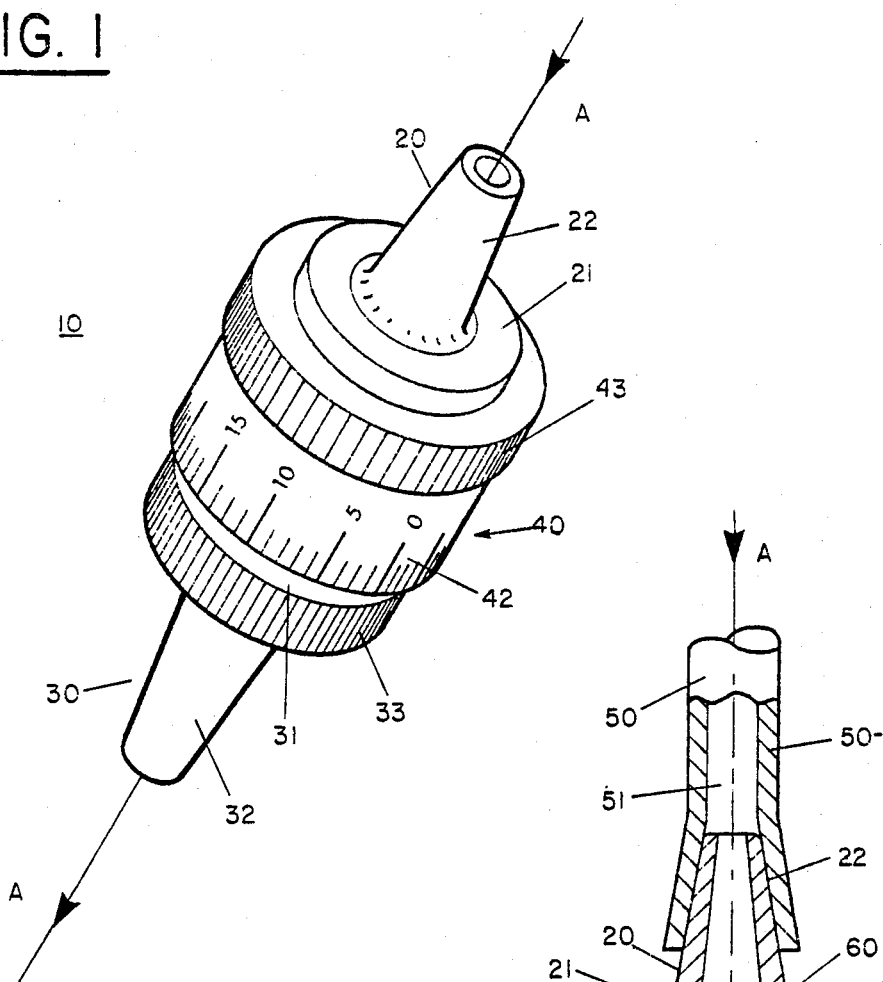
FIG. 1 is a perspective view of the a control valve in accordance with the invention.

With reference of the drawings, an illustrative control valve 10 in accordance with the invention is shown in FIG. 1.

Figure 2:
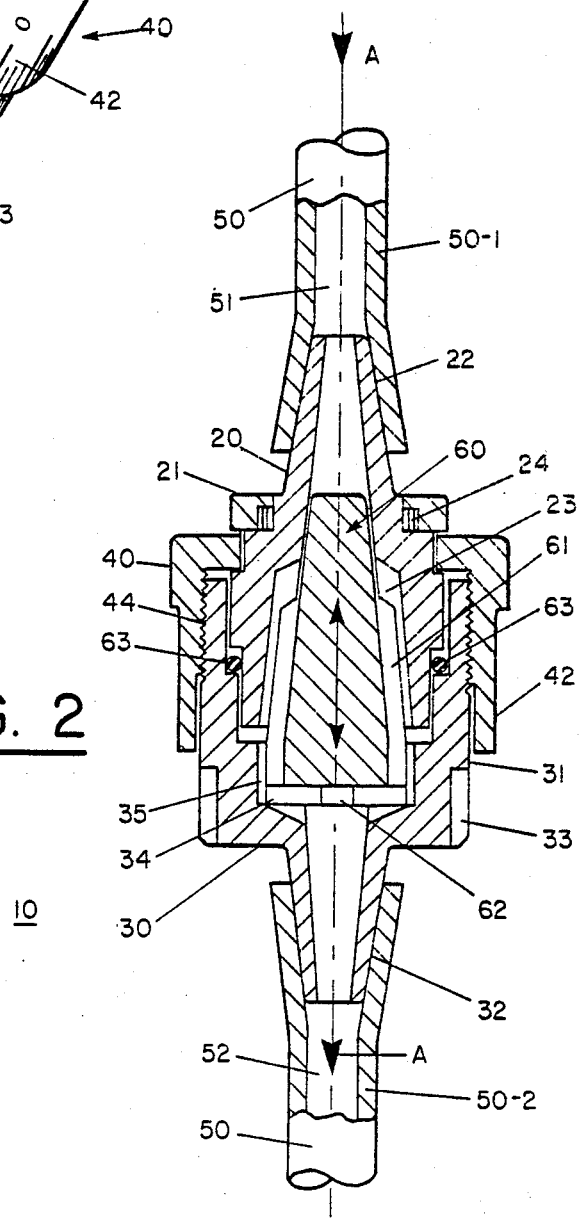
FIG. 2 is a cross-sectional view of the control valve of FIG. 1.

The control valve 10 is formed by complementary body members 20 and 30 which are connectable between sections 50-1 and 50-2 of a line 50 as shown in FIG. 2.

Returning to the overall configuration of the control valve 10 in FIG. 1, a transitional body member 20 is movable with respect to a base member 30 by a micrometer adjustable flow ring 40. The flow ring is rotationally secured to the body member 20 by a lock ring 21. The flow ring 40 includes on its periphery a set of graduations 42 that permit the accurate positioning of the transitional section 20 with respect to the base section 30 with reference to an indexing mark 31 on the base section 30. The flow ring 40 also includes a knurled periphery 43 to facilitate a gripping engagement with the control ring during adjustment operations. The base member 30 includes a similar knurled periphery 33. In the adjustment operation the knurled periphery 33 is gripped by the fingers of one hand and the knurled periphery 43 is gripped by the fingers of the other hand. The two parts 40 and 30 are rotated relative to one another to the desired setting. In practice, as indicated in FIG. 2, the neck 32 of the base 30 is fixed in a tubing section 50-2 so that only the control ring 40 is movable. Similarly, the neck 22 of the transitional member 20 is fixed in a tubular section 50-1 as indicated in FIG. 2. Flow through the valve 40 is in the direction indicated by the arrows A.

The internal constructional details of the valve 10 are set forth in FIG. 2. Control is principally exercised by a metering plug 60 which rests initially in a recessed cup 34 of the base member 30. When the control ring 40 is elevationally rotated with respect to the base 30, it carries the transitional section 20 away from the cup region 34 and thus increases the interval between the taper of the metering plug 60 and the corresponding internal taper of the member 20. The plug 60 includes positioning fins 61 which are located within corresponding recesses 22 of the section 20. Similarly, the fins 61 also are positioned with respect to recesses 35 of the base member 30. In addition, the plug 60 contains channels 62 which provide ingress into the outgoing channel 52 from the incoming channel 51. The desired seal between the members 20 and 30 for longitudinal movements is provided by an "O" ring 63. The various parts are assembled by positioning the metering plug 60 in the base of the base member 30 and then sliding the transitional member 20 over the plug onto the base. This is followed by threading the flow ring 40 onto the base member 20 and applying a lock ring 21 near the base of the neck of the transitional member to provide a surface that is engaged by the flow ring 40 during micrometer adjustment operations. The lock ring is desirably secured to the connector 20 by ultrasonic bonding and there are supplementary locking ribs 24 provided to promote the desired locking action.

Figure 3:
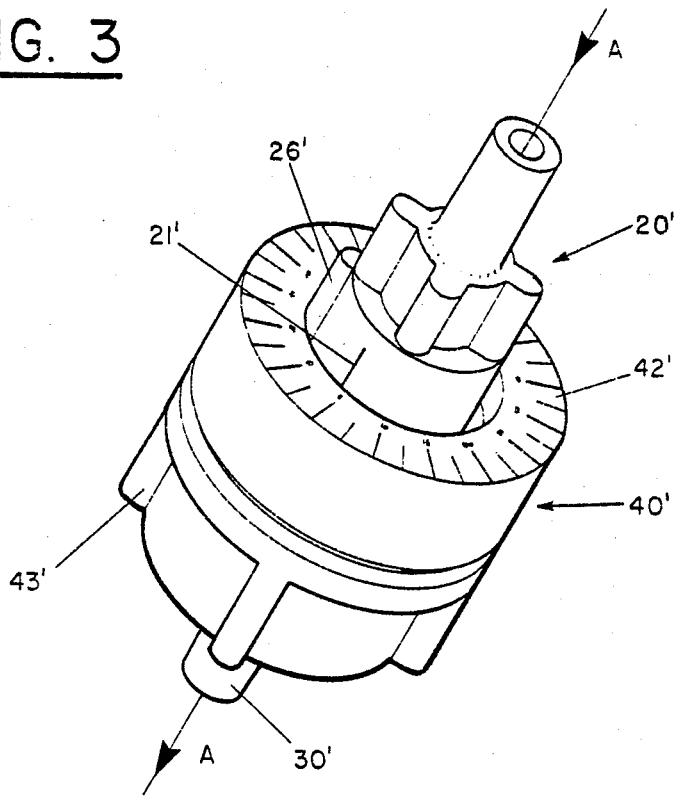
FIG. 3 is a perspective view of an alternative control valve in accordance with the invention.

An alternative control valve 10' is shown in FIG. 3. The valve 10' is formed by complementary body members 20' and 30' which are connectable between sections 50-1 and 50-2 of the line 50 as shown in FIG. 4.

In the overall configuration of the valve 10' in FIG. 3 the body member 20' is movable with respect to the other member 30' by a micrometer adjustable flow ring 40'. The flow ring 40' includes on its collar a set of graduations 42' that permit the accurate positioning of the transitional section 20' with respect to the base section 30'. The collar is movable with respect to an indexing mark 21' through 360° reaching a stop 26' when fully open. The flow ring 40' also includes flutings 43' on its lower portion to facilitate gripping during adjustment operations. The transitional member 20' includes similar flutings 25' to promote gripping. In the adjustment operation the flutings 43' are gripped by the fingers of one hand and the similar flutings 25' are gripped by the fingers of the other hand. The flow ring 40' is then rotated to the desired setting.

Figure 4:
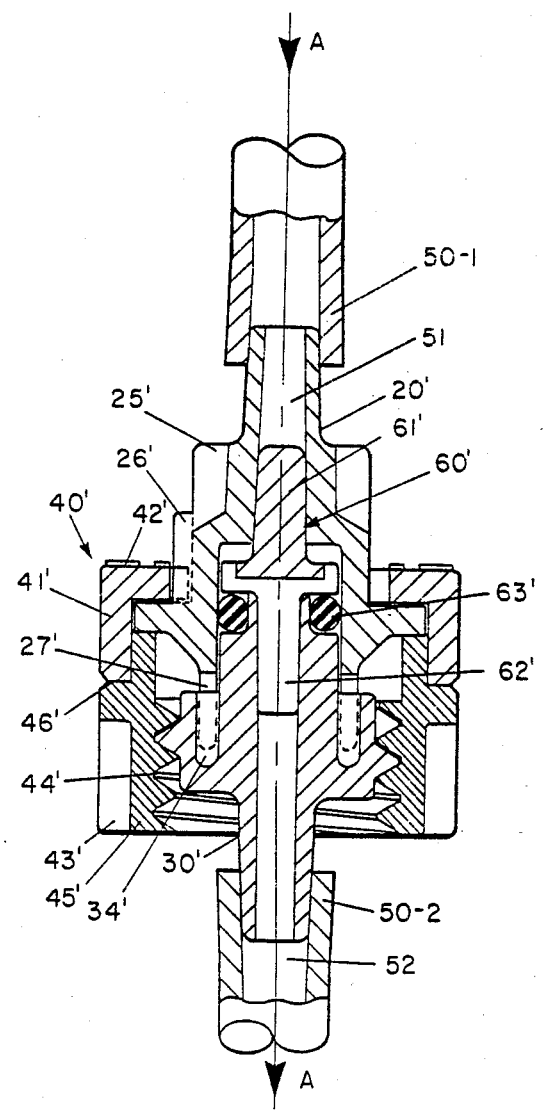
FIG. 4 is a cross-sectional view of the control valve of FIG. 3.

The internal construction details of the valve 10' are shown in FIG. 4. Control is effected by a metering plug 60' which is in two parts 61' and 62'. The part 61' is press fit into the part 62' which includes a flow channel 62f provided by sections which are spaced apart according to the desired channel width and held apart by the member 61'. The plug 60' formed by the combination of the parts 61' and 62' is press fit into the base member 30' and serve to position a sealing "O" ring 63' with respect to the transitional member 20'. The base member 30' includes recesses 34' which receive fingers 27' of the member 20'.

In the assembly of the valve 10', once the O ring 63' has been positioned on the neck of the member 30' and the plug 60' has been seated in the channel of the base member 30', the transitional member 20' is located on the base member 30' with the fingers 27' in the recesses 34'. A ring portion 43' is then threaded onto the base member 30' at thread positions 44'. A retaining portion 41' is then positioned over the transitional member 20' and ultrasonically sealed to the ring 43' at an interface 46'. The valve 10' is then ready for operation.

While various aspects of the invention have been set forth by the drawings and specification, it is to be understood that the foregoing detailed description is for illustration only and that various changes in parts, as well as the substitution of equivalent constituents for those shown and described may be made without departing from the spirit and scope of the invention as set forth in the appended claims.

What is claimed is:

1. A flow control valve comprising
   a base member having at least one guide recess therein and a flow channel therethrough;
   a transitional member having a flow channel therethrough and at least one finger that extends into said guide recess, said transitional member being axially movable with respect to the base member;
   a flow control ring for axially moving the transitional member with respect to said base member;
   and a tapered metering plug positioned within the channel between the two members, with the taper of said metering plug being identical to that of said low channel and extending over a shorter interval;
   said metering plug having a blunt end insertable into said flow channel in order to enhance the precision control overflow through said channel provided by the movement of said metering plug into said channel.

2. A flow control valve as defined in claim 1 wherein said transitional member has an unthreaded collar thereon;
   said base member has threads on one end thereof;
   a first ring is threaded on the threads of said base member; and
   a second ring slidably surrounds said transitional member at the collar thereof and is connected to said first ring;
   whereby rotation of said first ring provides procision adjustment of said tapered metering plub with respect to the corresponding taper of said flow channel in said transitional member.

3. A flow control valve as defined in claim 1 wherein the metering plug is secured to one of the members.

4. A flow control valve as defined in claim 1 wherein the metering plug includes at least one channel for flow therethrough.

5. A flow control valve as defined in claim 1 wherein said flow control ring is in two circumferentially mating parts which are held together by ultrasonic bonding.

* * * * *